United States Patent
Jones

(10) Patent No.: US 10,646,058 B2
(45) Date of Patent: May 12, 2020

(54) RETAIL DISPLAY SYSTEM WITH POWER SUPPLY INTERFACE

(71) Applicant: Jeffrey A. Jones, Southlake, TX (US)

(72) Inventor: Jeffrey A. Jones, Southlake, TX (US)

(73) Assignee: VIRA Insight, LLC, Coppell, TX (US)

(*) Notice: Subject to any disclaimer, the term of this patent is extended or adjusted under 35 U.S.C. 154(b) by 0 days.

(21) Appl. No.: 16/266,250

(22) Filed: Feb. 4, 2019

(65) Prior Publication Data

US 2020/0008591 A1 Jan. 9, 2020

Related U.S. Application Data

(60) Provisional application No. 62/695,579, filed on Jul. 9, 2018.

(51) Int. Cl.

| | | |
|---|---|---|
| *A47F 11/10* | (2006.01) | |
| *A47F 5/10* | (2006.01) | |
| *H02G 5/04* | (2006.01) | |
| *A47B 96/02* | (2006.01) | |
| *A47B 96/14* | (2006.01) | |
| *H01R 25/14* | (2006.01) | |

(52) U.S. Cl.
CPC .............. *A47F 11/10* (2013.01); *A47B 96/02* (2013.01); *A47B 96/1466* (2013.01); *A47F 5/103* (2013.01); *H01R 25/14* (2013.01); *H02G 5/04* (2013.01)

(58) Field of Classification Search
CPC .......... A47F 11/10; A47F 5/103; A47F 3/001; A47F 5/00; A47F 5/0043; A47F 5/08; H02G 5/04; H01R 9/2608; H01R 13/62; H01R 25/14; H01R 25/16; H01R 25/161; A47B 2097/003; A47B 96/02; A47B 96/027; A47B 96/14; A47B 96/1416; A47B 96/1433; A47B 96/1466; A47B 96/1483; A47B 2096/1491; F21V 33/0012
USPC ....... 211/26.2, 94.01, 90.01, 87.01, 103, 26; 174/480, 495, 499; 362/127, 145; 439/110, 114, 116

See application file for complete search history.

(56) References Cited

U.S. PATENT DOCUMENTS

| | | | | |
|---|---|---|---|---|
| 4,232,183 A | * | 11/1980 | Person | E04B 2/7444 160/127 |
| 4,459,790 A | * | 7/1984 | Vermillion | E04B 2/825 52/241 |
| 4,646,211 A | * | 2/1987 | Gallant | H01R 25/16 362/149 |
| 4,795,355 A | * | 1/1989 | Dorn | H02G 5/04 174/495 |
| 4,973,796 A | * | 11/1990 | Dougherty | E04B 2/82 174/494 |

(Continued)

*Primary Examiner* — Jennifer E. Novosad
(74) *Attorney, Agent, or Firm* — Dan Brown Law Office; Daniel R. Brown

(57) ABSTRACT

An electrified display system for use with a retail shelving unit that employs a backer panel that has pair of right-angled electrical conductors disposed in a recessed channel on its front surface. The backer panel can selectively engage and couple the electric power to a first display panel having a straight-in electrical connector that engages a first leg on each of the right angled conductors, or second display panel having a twist and lock electrical connector that engages a second leg on each of the right-angled electrical conductors.

12 Claims, 4 Drawing Sheets

(56) References Cited

U.S. PATENT DOCUMENTS

| | | | | |
|---|---|---|---|---|
| 5,022,720 A * | 6/1991 | Fevig | A47F 3/005 | 108/107 |
| 5,334,037 A * | 8/1994 | Gabrius | H01R 25/142 | 439/118 |
| 5,348,485 A * | 9/1994 | Briechle | H01R 25/14 | 439/110 |
| 5,593,049 A * | 1/1997 | Farham | H02G 3/288 | 174/499 |
| 6,527,406 B1 * | 3/2003 | Slesinger | A47F 11/10 | 312/223.6 |
| 6,527,565 B1 * | 3/2003 | Johns | H01R 25/14 | 362/418 |
| 7,256,346 B2 * | 8/2007 | Walter | A47B 96/14 | 174/481 |
| 7,766,502 B2 * | 8/2010 | Tress | A47B 97/00 | 362/125 |
| 8,070,309 B2 * | 12/2011 | Otsuki | A47F 3/001 | 362/125 |
| 8,177,404 B2 * | 5/2012 | Weng | A47F 11/10 | 362/125 |
| 8,607,997 B2 * | 12/2013 | Bergdoll | A47F 5/103 | 211/187 |
| 8,939,779 B1 * | 1/2015 | Lindblom | H01R 13/625 | 439/121 |
| 8,978,901 B2 * | 3/2015 | Hogeback | A47F 5/08 | 211/74 |
| 9,057,513 B2 * | 6/2015 | Lindblom | F21V 21/34 | |
| 9,149,130 B2 * | 10/2015 | Yuen | A47F 3/001 | |
| 9,364,100 B2 * | 6/2016 | Browning | A47F 3/001 | |
| 9,404,645 B1 * | 8/2016 | Feng | F21V 23/001 | |
| 9,537,274 B1 * | 1/2017 | Dankelmann | H01R 25/142 | |
| 9,537,275 B2 * | 1/2017 | Ewing | A47F 3/001 | |
| 9,700,157 B2 * | 7/2017 | Keyvanloo | A47F 5/0853 | |
| 9,774,134 B2 * | 9/2017 | Bonner | H01R 25/16 | |
| 9,775,447 B2 * | 10/2017 | Wiemer | A47F 5/103 | |
| 9,782,018 B2 * | 10/2017 | Hester-Redmond | A47F 5/08 | |
| 9,831,642 B2 * | 11/2017 | Woodley | H02B 1/20 | |
| 9,961,795 B2 * | 5/2018 | Chen | H05K 1/02 | |
| 10,130,196 B2 * | 11/2018 | Burns | F21V 23/06 | |
| 10,405,674 B2 * | 9/2019 | Mercier | A47F 1/126 | |
| 2005/0173605 A1 * | 8/2005 | Villeneuve | A47F 5/0018 | 248/301 |
| 2005/0236349 A1 * | 10/2005 | Lagman | A47B 57/40 | 211/153 |
| 2006/0209537 A1 * | 9/2006 | Stelmasik | A47F 11/10 | 362/217.16 |
| 2008/0121146 A1 * | 5/2008 | Burns | A47F 5/101 | 108/23 |
| 2010/0006519 A1 * | 1/2010 | Van De Steen | A47B 96/02 | 211/26 |
| 2011/0204009 A1 * | 8/2011 | Karan | A47F 1/12 | 211/59.2 |
| 2011/0215212 A1 * | 9/2011 | Keyvanloo | A47B 57/42 | 248/220.22 |
| 2013/0107501 A1 * | 5/2013 | Ewald | A47F 5/0853 | 362/145 |
| 2014/0055987 A1 * | 2/2014 | Lindblom | A47F 3/001 | 362/125 |
| 2014/0104826 A1 * | 4/2014 | Bergdoll | A47B 57/16 | 362/223 |
| 2014/0224875 A1 * | 8/2014 | Slesinger | H01R 25/142 | 235/385 |
| 2015/0036326 A1 * | 2/2015 | Maciulewicz | A47F 11/10 | 362/133 |
| 2015/0128398 A1 * | 5/2015 | Benlevi | A47F 10/06 | 29/426.2 |
| 2015/0201762 A1 * | 7/2015 | Walter | F21V 21/35 | 211/187 |
| 2015/0241034 A1 * | 8/2015 | Dankelmann | H05K 1/189 | 362/219 |
| 2015/0241035 A1 * | 8/2015 | Dankelmann | F21V 21/005 | 362/219 |
| 2016/0061429 A1 * | 3/2016 | Waalkes | F21V 23/001 | 362/217.15 |
| 2016/0097516 A1 * | 4/2016 | Howard | G09F 3/204 | 362/98 |
| 2016/0174733 A1 * | 6/2016 | Cinici | A47F 3/001 | 312/128 |
| 2016/0316939 A1 * | 11/2016 | Kraiss | A47F 5/103 | |
| 2017/0198871 A1 * | 7/2017 | Keenan | F21S 8/036 | |
| 2019/0298083 A1 * | 10/2019 | Lee | A47B 96/021 | |
| 2020/0008591 A1 * | 1/2020 | Jones | A47F 11/10 | |

* cited by examiner

RETAIL DISPLAY SYSTEM WITH POWER SUPPLY INTERFACE

RELATED APPLICATIONS

This invention claims priority from U.S. provisional patent application Ser. No. 62/695,579 filed on Jul. 9, 2018.

BACKGROUND OF THE INVENTION

Field of the Invention

The present disclosure generally relates to retail shelving systems. More particularly, the present disclosure relates to electrical power distribution in a modular retail shelving system, including gondola, end cap, and wall unit shelving systems.

DESCRIPTION OF RELATED ART

Retail shelving units come in a variety of configurations for a variety of purposes. A commonly employed shelving system is one which can be configured as gondola shelving, which are self supporting, back-to-back shelves, end cap shelving, which can terminate the end of a row of gondola shelves, and wall units, which are essential one-half of a gondola unit placed against a wall or other object. Of course, there are a myriad of shelving and display fixtures utilized in retail sales, and it is to be understood that the teachings of this disclosure are applicable to virtually all of them. Common characteristic of retail shelving are; expandability, reconfigurability, and modularity. These characteristics provide flexibility for retail operators in displaying a wide variety of product types, which will change from time to time.

Other important aspects of retail shelving are attractiveness, eye-appeal, and an attention-drawing design. The use of a wide range of signage, placards, pricing tags and the like are integrated into the aforementioned shelving systems. Another feature of shelving systems, which is becoming more prevalent in recent times, is the incorporation of electric features into the shelving system proper, as opposed to using external electrical appliances. Lighting, audio, video, and animated displays are some examples of the use of electricity in relation to retail shelving. A fully integrated shelving system with electrical interface is lower cost, more flexible, and less cluttered in its industrial design than a make-shift system. Thus, it can be appreciated that there is a need in the art for a retail display system that incorporates electric power, power distribution, and interconnections thereto in in a graceful and unified manner.

SUMMARY OF THE INVENTION

The present disclosure teaches an electrified display system for use with a retail shelving unit for supporting display fixtures, and for coupling electric power from a power supply to electric features supported from the retail shelving unit. The system includes a generally planar backer panel configured to engage the retail shelving unit, which has a recessed channel formed its front surface. A pair of right-angled electrical conductors aligned in parallel with one another, and oppositely disposed within the recessed channel, where each has a first leg aligned in parallel with the front surface and a second leg aligned perpendicular to the front surface. The backer panel can selectively engage and couple the electric power to a first display panel or second display panel. The first display panel connects to the backer panel to receive the electric power from the pair of right-angled electrical conductor by engaging a pair of electrical connectors with the first legs aligned in parallel with the front surface of the backer panel. The second display panel connects to the backer panel receive the electric power from the pair of right-angled electrical conductors by engaging a pair of electrical connector with the second legs aligned perpendicular with the front surface of the backer panel.

In a specific embodiment of the foregoing electrified display system, the first display panel pair of electrical connectors are spring loaded to engage the pair of right-right-angled electrical conductor. In another specific embodiment, the second display panel electrical connectors are supported on a twist and lock fastener rotatable through approximately ninety degrees between an insertion position and a locked position that retains the second display panel in the recessed channel.

In a specific embodiment of the foregoing electrified display system, the recessed channel is formed as an extrusion together with the backer panel. In another specific embodiment, the electric features are selected from lights, light boxes, audio devices, video devices, and animated displays, and the pair of electrical connectors are coupled to provided electric power to the electric features.

The present disclosure teaches an electrified display system for use with a retail shelving unit that has shelf mounting rails for supporting display fixtures, and for coupling electric power from a power supply to electric features supported from the retail shelving unit. The system includes a generally planar backer panel configured to engage the shelf mounting rails on the shelving unit, where the the backer panel has a recessed channel formed through its front surface, which that defines an elongated opening in the backer panel. A pair of right-angled electrical conductors are aligned in parallel with one another, and oppositely disposed within the recessed channel, where each has a first leg aligned in parallel with the front surface and a second leg aligned perpendicular to the front surface. The backer panel selectively engages and couples the electric power to a first display panel or a second display panel. The first display panel includes a boss extending from its back surface, where the boss is proportioned to fit through the elongated opening in the backer panel. The first display panel includes a pair of electrical connectors extending from the boss such that the pair of electrical connectors correspondingly engage the pair of right angled electrical conductors along the first legs that are aligned in parallel with the front surface of the backer panel. The second display includes a twist and lock connector assembly extending from its back surface, which is rotatable between an insertion position through approximately ninety degrees to a locked position, and has an extension therefrom proportioned to fit through the elongated opening. There are a pair of electrical connectors extending laterally from the extension that rotate together with the twist and lock electrical assembly, wherein the pair of lateral electrical connectors correspondingly engage the pair of right-angled electrical conductors along the second legs aligned perpendicular with the front surface of the backer panel while when the second display panel is engaged with the backer panel and the twist and lock connector assembly is rotated to the locked position.

In a specific embodiment of the foregoing electrified display system, the first display panel pair of electrical connectors are spring loaded within the boss to engage the pair of right-right-angled electrical conductor. In another specific embodiment, the second display panel electrical connectors engage the backer panel to retain the second display panel on the backer panel.

In a specific embodiment of the foregoing electrified display system, the recessed channel is formed as an extrusion together with the backer panel.

In a specific embodiment of the foregoing electrified display system, the electric features are selected from lights, light boxes, audio devices, video devices, and animated displays, and the pair of electrical connectors are coupled to provided electric power to that electric features.

In a specific embodiment of the foregoing electrified display system, the first display panel comprises mounting tabs to engage the display panel to the shelf mounting rails. In another specific embodiment, the retail shelving unit includes a structural base, shelves, and shelf mounting brackets, and the power supply is disposed within the structural base.

DESCRIPTION OF THE INVENTION

Figure 1:
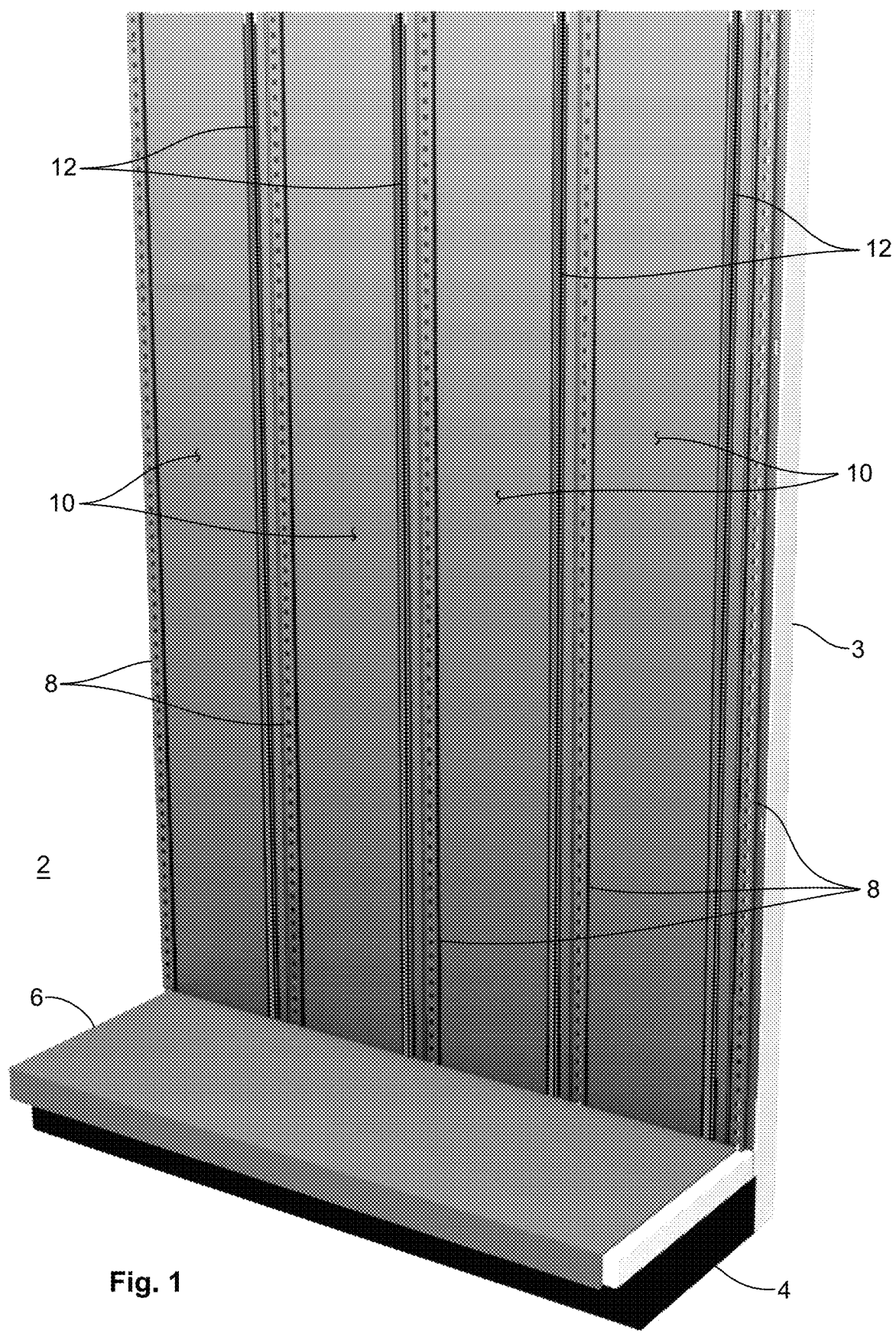
FIG. 1 is a is a perspective view drawing of a retail shelving unit according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

Reference is directed to FIG. 1, which is a perspective view drawing of a retail shelving unit 2 according to an illustrative embodiment of the present disclosure. The base structure consists of a structural base 4 with structural uprights 3. A base deck 6 may be placed upon the base 4, and can serve as a base shelf as well. A back wall is comprised of plural backer panels 10 positioned between plural shelf mounting rails 8. The shelf mounting rails 8 are structural and connected to the structural uprights 3, and serve to support a variety of shelving units, which can have a wide range of configurations. The shelf mounting rails 8 are punched with a row of holes for engaging shelf brackets (not shown) and the like for supporting shelves and the merchandise the selves may carry.

In this embodiment, each of the backer panels 10 are extruded from a suitable material, such as aluminum, plastic, or other polymer. Each backer panel 10 has a recessed channel 12 formed therein, which is arranged vertically. The recessed channels 12 can also be arranged horizontally or diagonally across the surface of the backer panel 10. The recessed channels 12 have a specific profile, which will be more fully discussed hereinafter, for supporting plural electrical conductors in the manner of busbars for electrical power distribution. Electric power may be drawn from anywhere on the recessed channels 12 on any of the backer panels 10. In a typical embodiment, the backer panel 10 are nominally twelve inches wide, so power is available a short distance from any position on the shelving unit 2.

Figure 2:
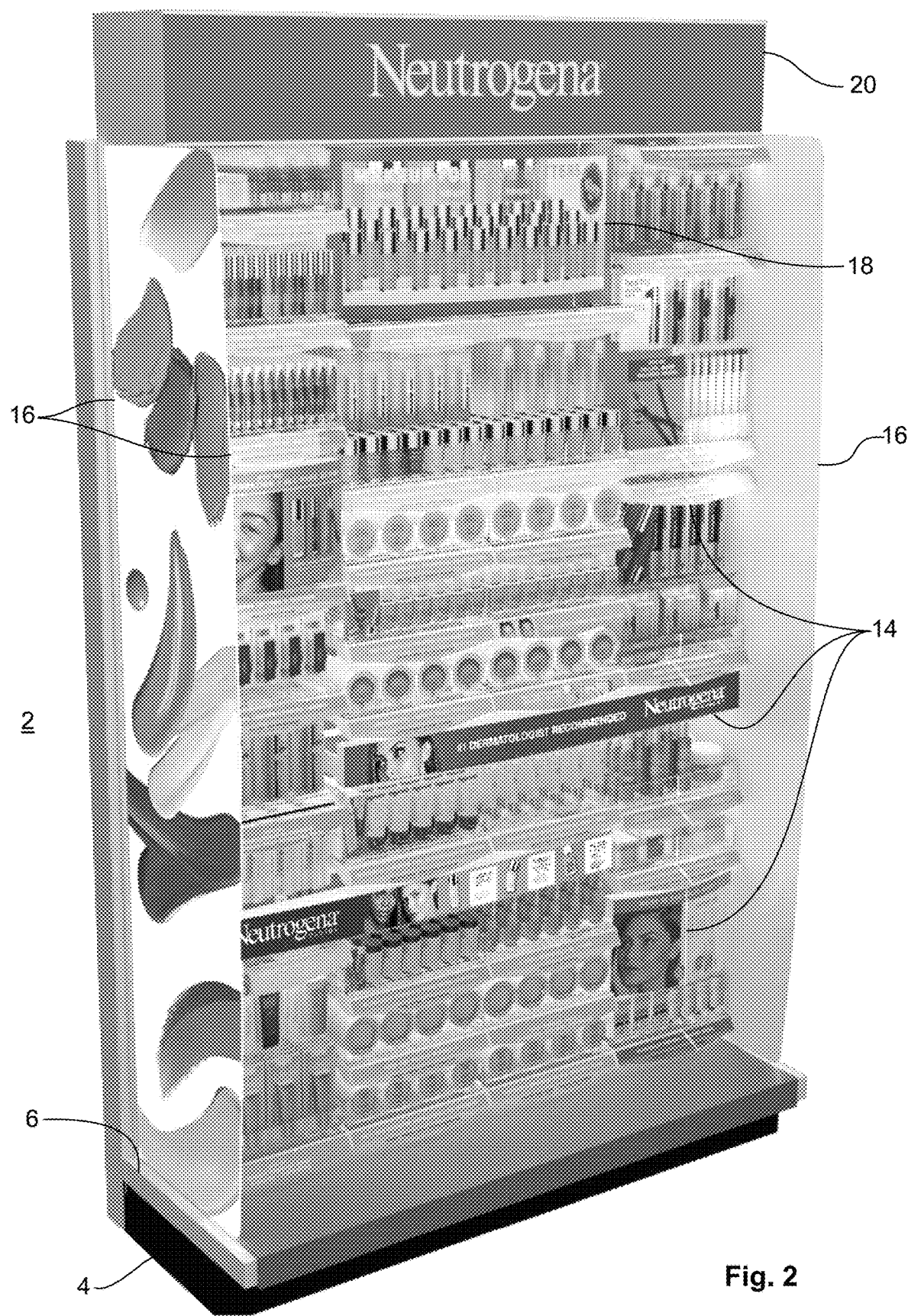
FIG. 2 is a is a perspective view drawing of a retail shelving unit with displayed goods and fixtures according to an illustrative embodiment of the present invention.

Reference is directed to FIG. 2, which is a is a perspective view drawing of a retail shelving unit 2 with displayed goods and fixtures according to an illustrative embodiment of the present disclosure. This drawing presents a fully configured shelving unit 2. The structural base 4 is illustrated with a base deck 6 thereon. Either side of the shelving unit 2 has an end divider 16, which have an attractive graphic imprinted thereon. Plural shelves and trays 14 are illustrated, some of which have integrated lighting to add eye-appeal and attractiveness to the display unit 2. Note that a light box 18 is integrated near the top center of the display unit 2. A light box has an electric lamp within it to light the merchandise presented therein. The power for such lighting effects are drawn form the aforementioned recessed channel and busbars (not visible in this drawing). At the top of the display unit 2 is an illuminated header 20, useful for prominent branding, as illustrated.

Figure 3:
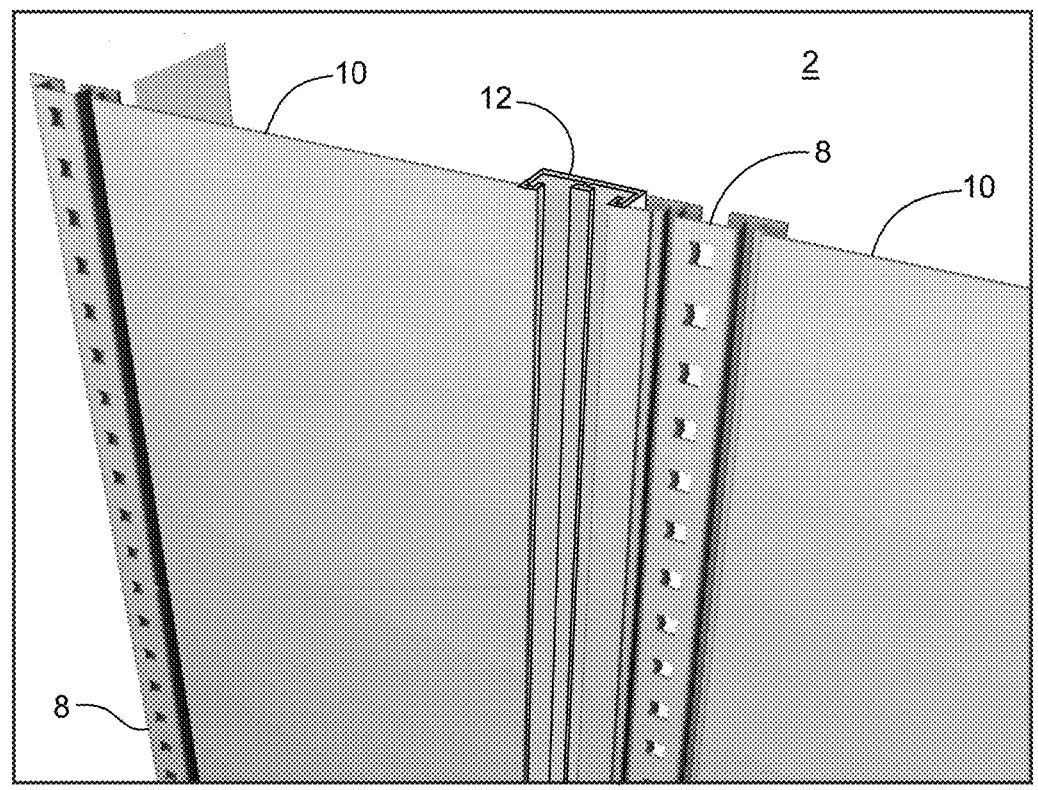
FIG. 3 is a is a detail view drawing of a portion of a back panel for a retail shelving unit according to an illustrative embodiment of the present invention.

Reference is directed to FIG. 3, which is a is a detail view drawing of a portion of a shelf unit 2 for a retail shelving unit according to an illustrative embodiment of the present disclosure. The back panel area comprises plural shelf mounting rails 8 with plural backer panels 10 positioned therebetween. Shelves (not shown) and other fixtures are supported by the plural holes punched in the shelf mount rails 8. The details of the recessed channel 12 can be seen, which shape is created as the backer panels 10 are extruded.

Figure 4:
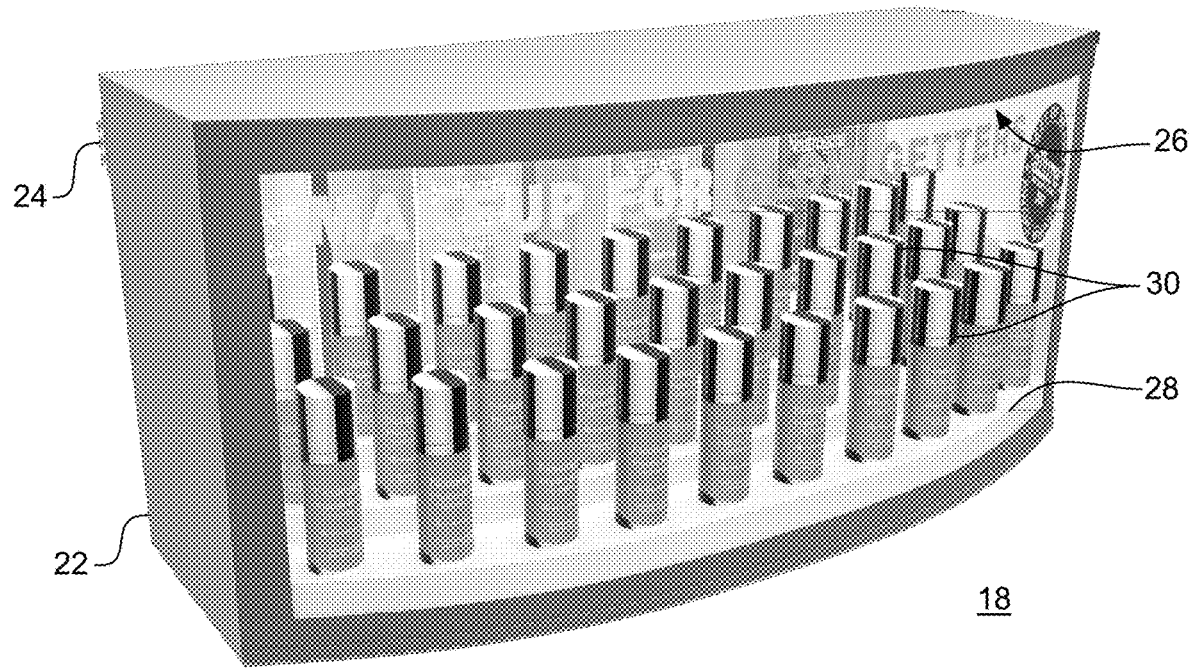
FIG. 4 is a is a perspective view drawing of a light box assembly, with merchandise, for a retail shelving unit according to an illustrative embodiment of the present invention.

Reference is directed to FIG. 4, which is a is a perspective view drawing of a light box assembly 18, with merchandise 30, for a retail shelving unit according to an illustrative embodiment of the present disclosure. This light box 18 has a molded product shelf 28 with plural units of product 30 resting thereon. The light box includes an enclosure 22 with a light 26 inside to illuminate the product 30. Note that the light box 18 has plural mounting tabs 24 extending from the rear to engage the aforementioned shelf mounting rails 8 (not shown). As such, this light box 18 is hung from the shelving unit and draws electric power therefore to power the light 26, in a fully integrated fashion.

Figure 5:
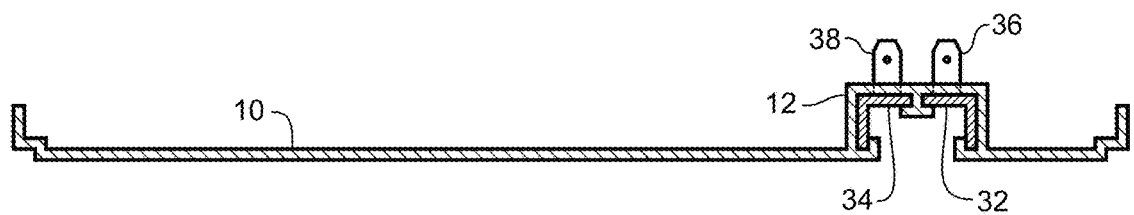
FIG. 5 is a is a section view drawing of a panel backer for a retail shelving unit according to an illustrative embodiment of the present invention.

Reference is directed to FIG. 5, which is a is a section view drawing of a panel backer 10 for a retail shelving unit according to an illustrative embodiment of the present disclosure. As noted hereinbefore, the backer panel 10 has a recessed channel 12 extruded therein. The recessed channel 12 supports a pair of right angled electrical conductors 32 and 34, also referred to as busbars, which are electrically energized through electric tabs 36, 38, respectively. In the illustrative embodiment, the busbars 32, 34 are powered at 24-volts DC by an external power supply, such as the familiar "wall wart" or "cord wart" power supplies. The power supply (not shown) could also be integrated into the base (not shown) of the shelf unit. The electrical tabs 36, 38 coupled to the busbars 32, 34 could also be by attached by screws and nuts, clips, compression connectors, or other connections known to those skilled in the art, including industry standard connectors or proprietary connectors. A feature of the embodiment is the use of right angled conductors 32, 34 as busbars, which provided for making electrical contact therewith along either leg of the right angled conductors 32, 34. Thus, a mating connector could orient electric contacts straight into the recessed channel 12, or could enter the recess and couple outwardly to either side of the recessed channel 12, as will be more full illustrated and described hereinafter.

Figure 6A:
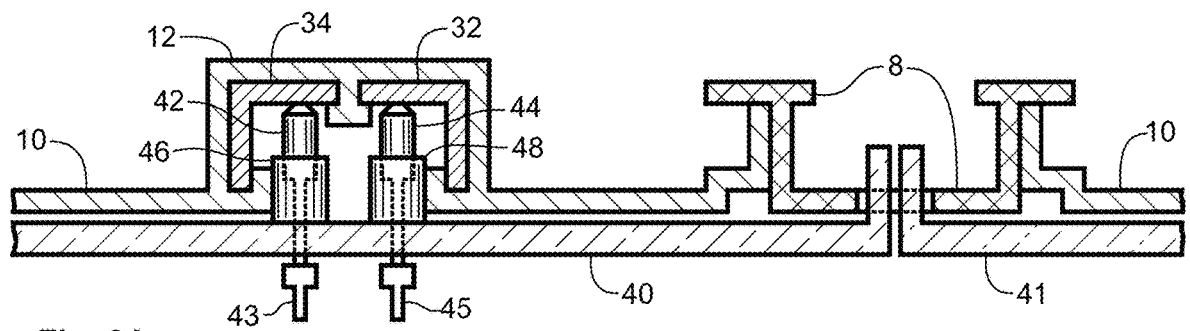
FIG. 6A is a is section view drawing of a back panel assembly for a retail shelving unit according to an illustrative embodiment of the present invention.
Figure 6B:
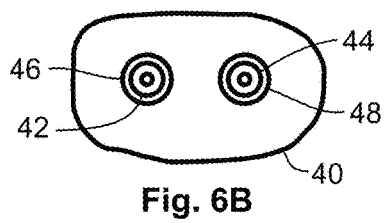
FIG. 6B is a is a detail view drawing of an electrical contact for a retail shelving unit according to an illustrative embodiment of the present invention.

Reference is directed to FIG. 6A, which is a section view drawing of a back panel assembly for a retail shelving unit according to an illustrative embodiment of the present disclosure. This drawing presents a shelf mounting rail 8 that has two backer panels 10 positioned on either side thereof, as illustrated. The recessed channel 12 in the backer panel 10 can be seen, with the pair of right angle electrical conductors 32, 34 positioned therein. In this embodiment, a pair of display panels 40, 41 are shown as engaged with the shelf mounting rail 8. These display panels 40, 41 are presented as an example only, and any other shelving configuration known to those skilled in the art could be implemented. The first display panel 40 has a pair of electric connectors 42, 44 supported on a respective pair of bosses 46, 48, which are aligned to extend into the recessed channel 12. The electrical connectors 42, 44 are spring (not shown) loaded to engaged the electrical busbars 32, 34, and are also electrically connected to respective power tabs 43, 45. Power terminals 43, 45 may be connected to wires (not shown) to thereby draw electric power from the busbars 32, 34 and into a electrified display of any sort. Note that the length of the contacts 42, 44 and the bosses 46, 48 are selected so that the contacts 42, 44 engage the busbars 32, 34 with sufficient force to assure an electrically conductive connection therebetween. When the display panel 40 is removed from the shelf mounting rail 8, the electrical contacts 42, 44 are also removed.

Figure 7A:
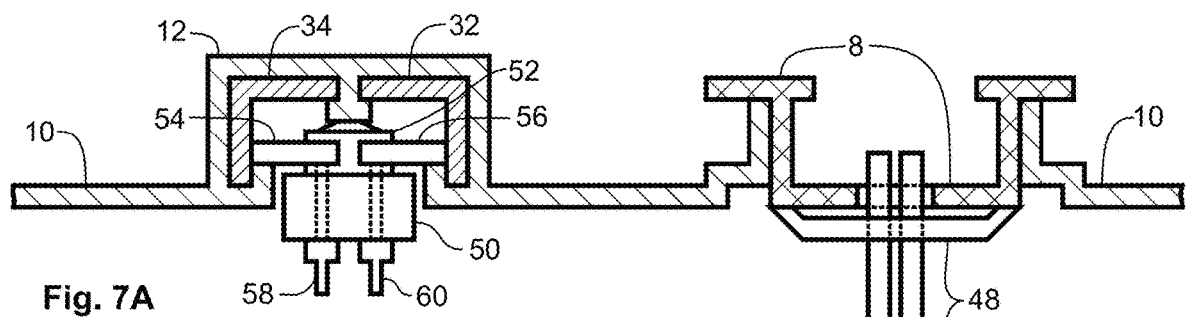
FIG. 7A is a is section view drawing of a back panel assembly for a retail shelving unit according to an illustrative embodiment of the present invention.

Reference is directed to FIG. 7A, which is section view drawing of a back panel assembly for a retail shelving unit according to an illustrative embodiment of the present disclosure. This drawing presents a shelf mounting rail 8 that has two backer panels 10 positioned on either side thereof, as illustrated. A conventional shelf bracket 48 is engaged with the shelf mounting rail 8 in the conventional fashion. The recessed channel 12 in the backer panel 10 can be seen, with the pair of right angle electrical conductor busbars 32, 34, positioned therein. In this embodiment, a twist and lock electrical connector 50 is presented. The twist lock connector 50 has a front extension 52 that is inserted into the recessed channel 12. The front extension 52 supports a pair of electrical contacts 54, 56 which rotate together with the twist lock electrical connector 50, which action causes the electrical contacts to engage the busbars 32, 34 to thereby provided electric power to a pair of terminals 58, 60 on the twist lock electrical connector 50, which is useful for powering any manner of shelving display. The twisting action also retains the twist lock electrical connector 50 in the recessed channel 12 by virtue of electrical contacts engaging the backer panel 10 recessed channel 12, as illustrated.

Figure 7C:
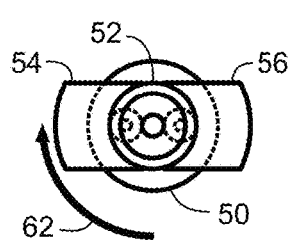
FIGS. 7B and 7C are detail view drawings of an electrical contact for a retail shelving unit according to an illustrative embodiment of the present invention.
Figure 7B:
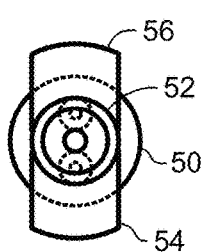

Reference is directed to FIGS. 7B and 7C, which detailed view drawings of a twist lock electrical connector 50 according to an illustrative embodiment of the present disclosure. In these views, it can be noted that rotation 62 of the twist lock electrical connector 50 by approximately ninety degrees changes the orientation of the electrical contacts 54, 56 such that then can pass into the aforementioned recessed channel (not shown), and then be rotated to engage and retain the twist lock electrical connector 50 in the recessed channel as illustrated in FIG. 7A.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An electrified display system for use with a retail shelving unit for supporting display fixtures, and for coupling electric power from a power supply to electric features supported from the retail shelving unit, the system comprising:

a backer panel having a generally planar configuration adapted to engage the retail shelving unit, said backer panel having a recessed channel formed through a front surface thereof;

a pair of right-angled electrical conductors aligned in parallel with one another, and opposingly disposed within said recessed channel, and each having a first leg aligned in parallel with said front surface and a second leg aligned perpendicular to said front surface, and wherein said backer panel can selectively engage and couple the electric power to a first display panel and a second display panel, and wherein said first display panel connects to said backer panel to receive the electric power from said pair of right-angled electrical conductors by engaging a pair of electrical connectors with said first legs aligned in parallel with said front surface of said backer panel, and wherein said second display panel connects to said backer panel to receive the electric power from said pair of right-angled electrical conductors by engaging a pair of electrical connectors with said second legs aligned perpendicular with said front surface of said backer panel.

2. The electrified display system of claim 1, and wherein:
said first display panel pair of electrical connectors are spring loaded to engage said pair of right-angled electrical conductor.

3. The electrified display system of claim 1, and wherein:
said second display panel electrical connectors are supported on a twist and lock fastener rotatable through approximately ninety degrees between an insertion position and a locked position that retains said second display panel in said recessed channel.

4. The electrified display system of claim 1, and wherein:
said recessed channel is formed as an extrusion together with said backer panel.

5. The electrified display system of claim 1, and wherein the electric features are selected from lights, light boxes, audio devices, video devices, and animated displays, and wherein:
each of said pair of electrical connectors are coupled to provide electric power to the electric features.

6. An electrified display system for use with a retail shelving unit having shelf mounting rails for supporting display fixtures, and for coupling electric power from a power supply to electric features supported from the retail shelving unit, the system comprising:
a backer panel having a generally planar configuration adapted to engage the shelf mounting rails on the shelving unit;
said backer panel having a recessed channel formed through a front surface thereof that defines an elongated opening in said backer panel;
a pair of right-angled electrical conductors aligned in parallel with one another, and opposingly disposed within said recessed channel, and each having a first leg aligned in parallel with said front surface and a second leg aligned perpendicular to said front surface, and wherein
said backer panel selectively engages and couples the electric power to a first display panel and a second display panel, and wherein said first display panel includes a boss extending from a back surface thereof, wherein said boss is proportioned to fit through said elongated opening, and wherein said first display panel further includes a pair of electrical connectors extending from said boss such that said pair of electrical connectors correspondingly engages said pair of right angled electrical conductors along said first legs aligned in parallel with said front surface of said backer panel, and wherein said second display includes a twist and lock connector assembly extending from a back surface thereof that is rotatable from an insertion position through approximately ninety degrees to a locked position, and having an extension therefrom proportioned to fit through said elongated opening, and having a pair of electrical connectors extending laterally from said extension that rotate together with said twist and lock connector assembly, and wherein said pair of laterally extending electrical connectors correspondingly engage said pair of right-angled electrical conductors along said second legs aligned perpendicular with said front surface of said backer panel while said second display panel is engaged with said backer panel and said twist and lock connector assembly is rotated to said locked position.

7. The electrified display system of claim 6, and wherein:
said first display panel pair of electrical connectors are spring loaded within said boss to engage said pair of right-angled electrical conductor.

8. The electrified display system of claim 6, and wherein:
said second display panel electrical connectors engage said backer panel to retain said second display panel on said backer panel.

9. The electrified display system of claim 6, and wherein:
said recessed channel is formed as an extrusion together with said backer panel.

10. The electrified display system of claim 6, and wherein the electric features are selected from lights, light boxes, audio devices, video devices, and animated displays, and wherein:
each of said pair of electrical connectors are coupled to provide electric power to that electric features.

11. The electrified display system of claim 6, and wherein:
said first display panel comprises mounting tabs to engage said display panel to the shelf mounting rails.

12. The electrified display system of claim 6, and wherein the retail shelving unit includes a structural base, shelves, and shelf mounting brackets, and wherein:
the power supply is disposed within the structural base.

* * * * *